(12) United States Patent
Chang

(10) Patent No.: US 9,665,192 B2
(45) Date of Patent: May 30, 2017

(54) ACTIVE STYLUS HAVING SWITCHING FUNCTION

(71) Applicant: eGalax_eMPIA Technology Inc., Taipei (TW)

(72) Inventor: Chin-Fu Chang, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 183 days.

(21) Appl. No.: 14/598,749

(22) Filed: Jan. 16, 2015

(65) Prior Publication Data

US 2015/0205391 A1    Jul. 23, 2015

Related U.S. Application Data

(60) Provisional application No. 61/928,881, filed on Jan. 17, 2014.

(51) Int. Cl.
*G06F 3/038* (2013.01)
*G06F 3/041* (2006.01)
*G06F 3/0354* (2013.01)

(52) U.S. Cl.
CPC ........ *G06F 3/0383* (2013.01); *G06F 3/03545* (2013.01); *G06F 3/041* (2013.01)

(58) Field of Classification Search
CPC .... G06F 3/0383; G06F 3/03545; G06F 3/041; G06F 3/0354; G06F 3/033; G06F 3/0386; G06F 3/038; G06F 3/03; G06F 3/01; G06F 3/00; G06F 3/03542; G06F 3/037; G06F 15/0208; B43K 8/22; B43K 29/00; B43K 29/08; B43K 29/20; B43K 29/093; B43K 29/10; B43K 29/003

USPC .......................................................... 345/179
See application file for complete search history.

(56) References Cited

U.S. PATENT DOCUMENTS

| 5,313,557 A * | 5/1994 | Osterhout ........... G06F 15/0208 369/64 |
| 6,550,997 B1 * | 4/2003 | King .......................... B41J 3/36 178/79 |
| 8,766,954 B2 * | 7/2014 | Vuppu .................... G06F 3/044 178/19.03 |
| 9,146,649 B1 * | 9/2015 | Chang .................... G06F 3/044 |
| 9,513,721 B2 * | 12/2016 | Stern .................... G06F 3/03545 |

(Continued)

*Primary Examiner* — Julie Anne Watko
(74) *Attorney, Agent, or Firm* — Muncy, Geissler, Olds & Lowe, P.C.

(57) ABSTRACT

The present disclosure illustrates an active stylus having switching function including a stylus body, a control apparatus and a pushing member. An accommodating space is formed inside the stylus body that includes a hollow part communicated with the accommodating space. The control apparatus has a circuit board disposed in the accommodating space and is connected electrically with a conductive elastomer of the hollow part. The pushing member is disposed on the surface of the stylus body and has control region thereof. Using the longitudinal displacement of the pushing member outside of the stylus body can change contact status between the conductive elastomer and the stylus body, further drive the circuit board to send different signal to the predetermined touch sensing device for switching touch control operations of different functions, and prevent user from mistakenly touching and opening the unexpected function operation while griping the stylus.

6 Claims, 6 Drawing Sheets

(56) References Cited

U.S. PATENT DOCUMENTS

| | | | | |
|---|---|---|---|---|
| 2008/0192006 A1* | 8/2008 | Lapstun | ............... | G06F 3/03545 345/158 |
| 2011/0090181 A1* | 4/2011 | Maridakis | ............... | B43K 19/00 345/179 |
| 2013/0135220 A1* | 5/2013 | Alameh | ................. | G06F 3/041 345/173 |
| 2014/0125606 A1* | 5/2014 | Namkung | ............. | G06F 1/1656 345/173 |
| 2014/0210744 A1* | 7/2014 | Song | ................... | G06F 3/03545 345/173 |
| 2014/0253468 A1* | 9/2014 | Havilio | ............... | G06F 3/03545 345/173 |
| 2015/0002482 A1* | 1/2015 | Mercea | ............... | G06F 3/03545 345/179 |
| 2015/0205383 A1* | 7/2015 | Chang | ................... | G06F 3/0383 345/179 |
| 2015/0205390 A1* | 7/2015 | Yeh | ....................... | G06F 3/0383 345/179 |
| 2015/0363012 A1* | 12/2015 | Sundara-Rajan | ....... | G06F 3/038 345/179 |
| 2016/0378211 A1* | 12/2016 | Kim | ................... | G06F 3/03545 345/173 |

* cited by examiner

ACTIVE STYLUS HAVING SWITCHING FUNCTION

This reference is based on Provisional Application Ser. No. 61/928,881, filed on Jan. 17, 2014.

BACKGROUND OF THE INVENTION

1. Field of the Invention

The present disclosure provides an active stylus having switching function, more particularly, to a stylus can utilize the longitudinal displacement of the pushing member on the outside of the stylus body to change the contact status between each conductive elastomer and the stylus body in the respective control region, and further to drive the circuit board to send different signal to the predetermined touch sensing device for switching the touch control operations.

2. Description of the Related Art

As current science and technology are developed rapidly, electronic devices such as cell phone, computer or TV, etc., are directed to development of the simpler operation for the user. Compared with the traditional manner of inputting operating instruction by buttons, such as the computer providing the user to input instruction by clicking an external keyboard, or the traditional cell phone providing the user to dial by pressing buttons, etc., current mainstream of input manner is touch control, electronic devices such as laptop computer, smart phone or tablet computer, etc., are provided with the manner of touch control for user's operation. An instruction or a software icon is displayed on a screen of the electronic device, and the user can approach or press the screen by her/his finger or a stylus to start a function operation. Therefore, the user can directly complete the operation for the electronic device without inputting a complex letter instruction.

Most styluses have a plurality of buttons disposed on surfaces thereof, to provide the user to press each button to start different functional operation, such as writing color changing, erasing, window switching or screen shot, etc., whereby the operation time and complex operation steps generated by the traditional manner of clicking step by step to start function can be reduced.

However, as the functions of the electronic device are diversified, the functional shortcut button on the surface of the stylus are also increased correspondingly, so it is easy for user to mistakenly touch the functional button exposed out of the surface of the stylus to start unexpected functional operation while the user grips the stylus, it causes that the electronic device is not very friendly for user to operate.

Therefore, what is need is to solve the problem of mistakenly touching caused by the shortcut button exposed out of the surface of the traditional stylus.

SUMMARY OF THE INVENTION

An exemplary embodiment of the present disclosure provides an active stylus having switching function which utilizes the longitudinal displacement of the pushing member on the outside of the stylus body to switch touch control function, so as to prevent unexpected touching due to the exposed function button.

Main objective of the present disclosure is to utilize the longitudinal displacement of the pushing member on the outside of the upper shaft of the stylus body to change the contact status between each of the control regions of the pushing member and the stylus body, to further generate different input signal to the circuit board for driving the circuit board to generate different signal to the predetermined touch sensing device to switch the touch control operations of different functions. Therefore, it is not necessary to dispose multiple function shortcut buttons on the surface of the stylus body, and the stylus of the present disclosure can prevent the user from mistakenly touching and starting the unexpected function operation while griping the stylus, whereby the operating convenience of the stylus can be improved.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1:
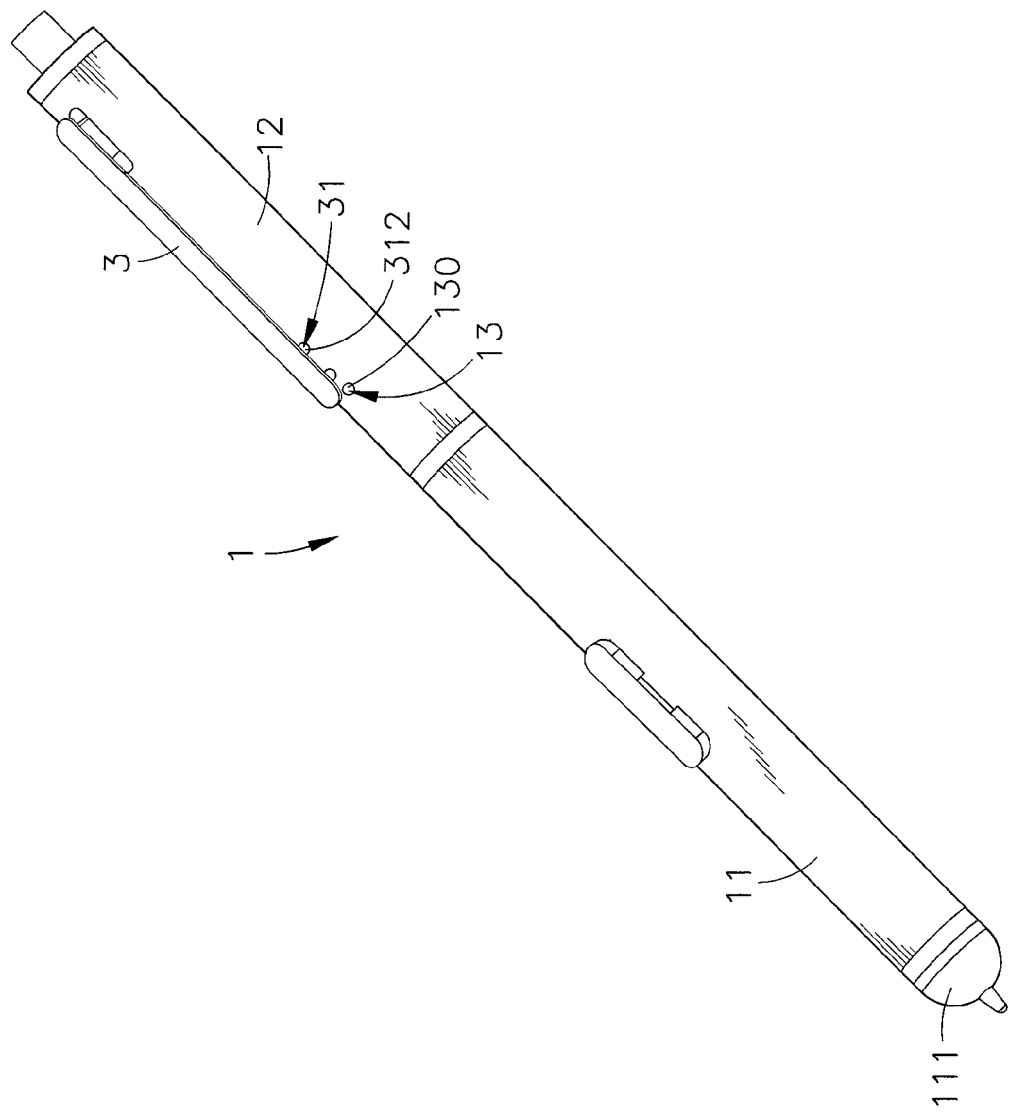
FIG. 1 is a perspective appearance view of a front surface of active stylus of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

Please refer to FIG. 1 through FIG. 6 which are perspective appearance view of the front surface of the active stylus, partial front view of the stylus body while the pushing member is removed, partial front view of the pushing member, top section view of the active stylus, partial lateral section view of the control apparatus and the pushing member, and equivalent circuit diagram of a circuit board. As shown in FIGS, the active stylus of the present disclosure includes a stylus body 1, a control apparatus 2 and a pushing member 3.

As shown in FIG. 1, the stylus body 1 has a lower shaft 11 which has a touch nib 111 disposed at a front side thereof, and an upper shaft 12 disposed at a side of the lower shaft 11 opposite to the touch nib 111 and made of conductive material. An accommodating space 10 is formed inside the lower shaft 11 and the upper shaft 12. The upper shaft 12 has a hollow part 13 which has two through holes 130 apart from each other transversely. The two through holes 130 are communicated with the accommodating space 10.

Figure 2:
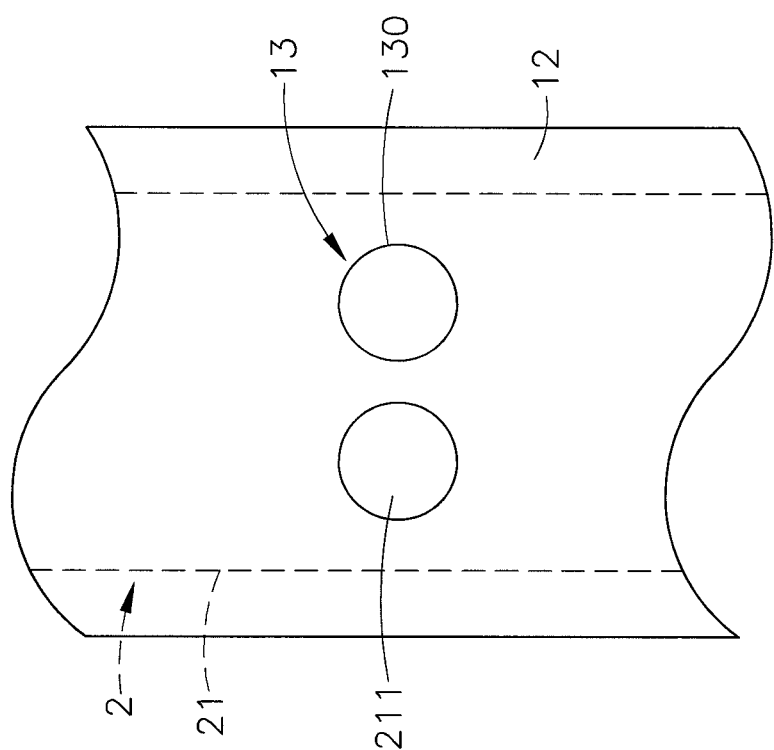
FIG. 2 is a partial front view of the stylus body of the present disclosure while a pushing member is removed.
Figure 6:
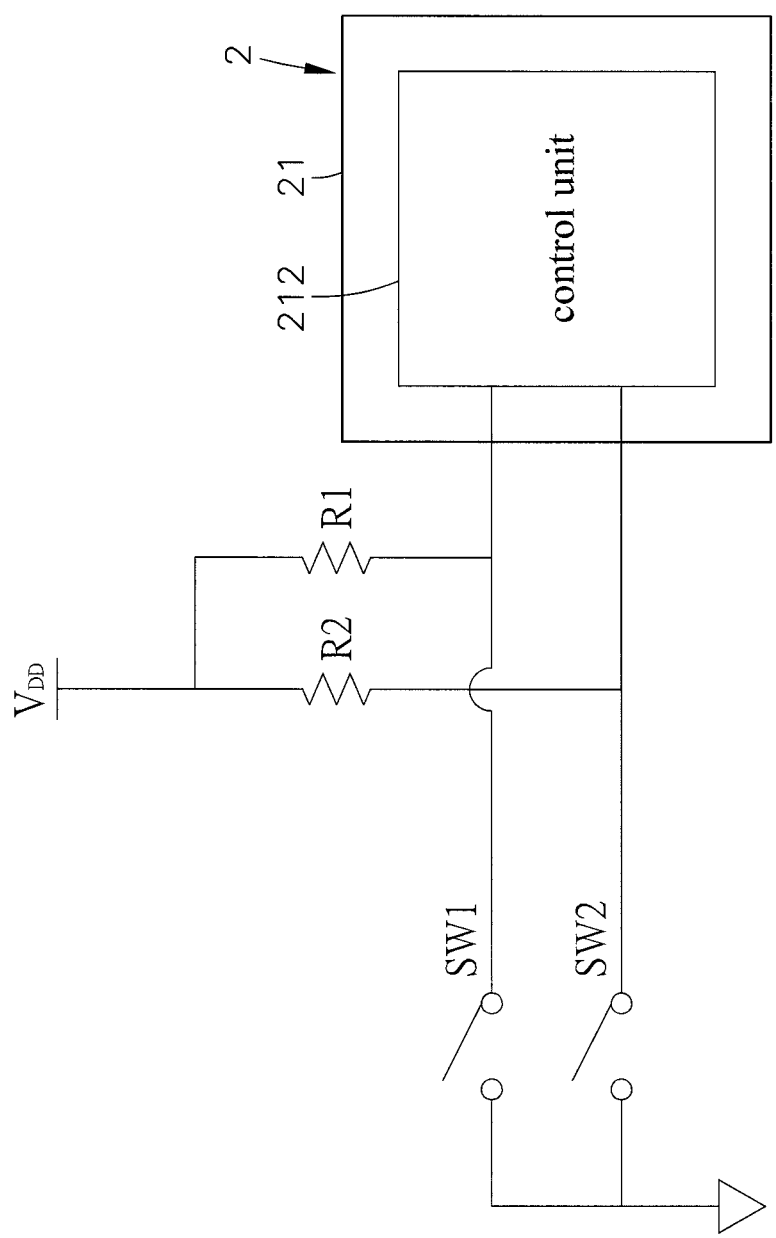
FIG. 6 is an equivalent circuit diagram of a circuit board of the present disclosure.

As shown in FIG. 2, the control apparatus 2 includes a circuit board 21. Two conductive elastomers 211 apart from each other transversely are connected electrically with a surface of the circuit board 21. As shown in FIG. 6, the circuit configuration of the circuit board 21 includes a power source $V_{DD}$, resistors R1 and R2 which are the same as the conductive elastomer 211 in number, a control unit 212 and two switches SW1 and SW2. The power source $V_{DD}$ is connected electrically to ends of the resistors R1 and R2, and other ends of the resistors R1 and R2 are connected electrically to ends of the switches SW1 and SW2, respectively, and other ends of the two switches SW1 and SW2 are respectively connected electrically to the control unit 212, and another ends of the two switches SW1 and SW2 are grounded.

Figure 3:
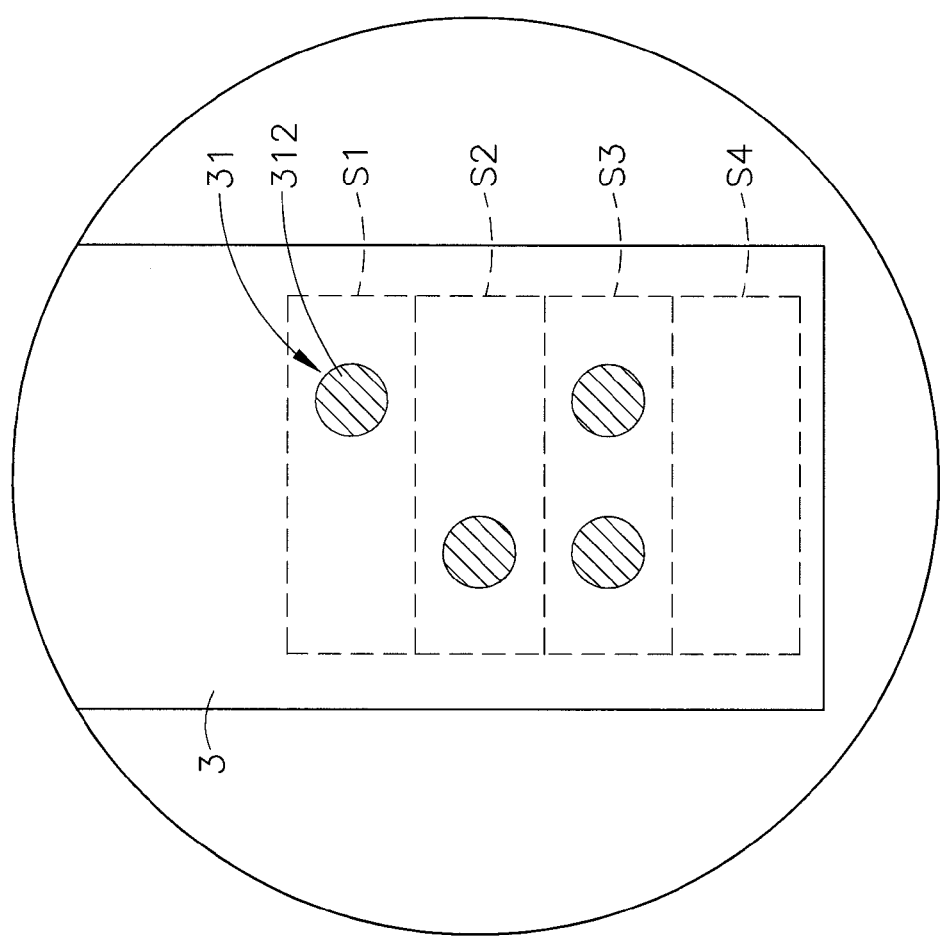
FIG. 3 is a partial front view of the pushing member of the present disclosure.
Figure 5:
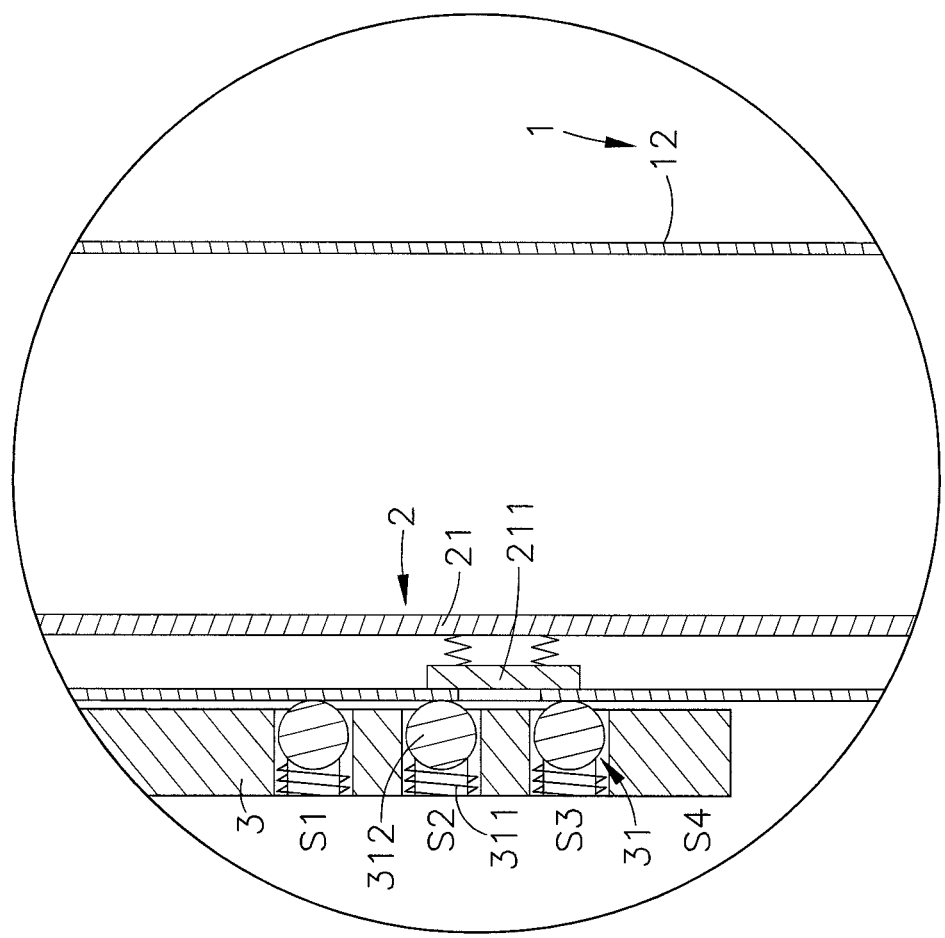
FIG. 5 is a partial lateral view of the pushing member and a control apparatus of the present disclosure.

As shown in FIG. 1 and FIG. 3, the pushing member 3 has, in order from top to bottom, four control regions S1, S2, S3 and S4 defined on the surface thereof. As shown in FIG. 5, a right-side control buttons 31 is disposed in the control region S1, a left-side control buttons 31 is disposed in the control region S2, two transversely aligned control buttons 31 are disposed in the control region S3, and no control button 31 is disposed in the control region S4. Each of control buttons 31 includes an elastomer 311 and a protrudent block 312 which is disposed at a top end of the elastomer 311.

Figure 4:
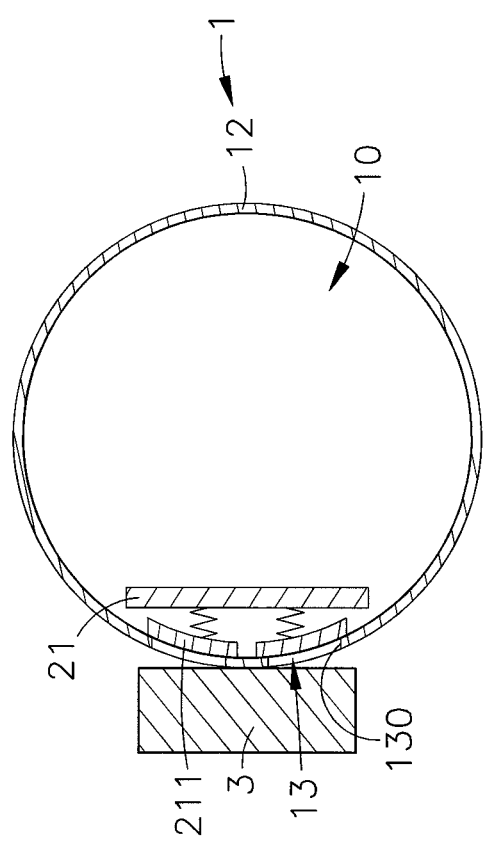
FIG. 4 is a top section view of the active stylus of the present disclosure.

As shown in FIG. 3, FIG. 4 and FIG. 5, while the active stylus having switching function of the present disclosure is assembled, the circuit board 21 of the control apparatus 2 is assembled into the accommodating space 10 of the stylus body 1, two conductive elastomers 211 on the surface of the circuit board 21 are exposed out of the through holes 130 of the hollow part 13 respectively to abut the inner surface of the upper shaft 12. The pushing member 3 is movably assembled on the surface of the upper shaft 12 of the stylus body 1, and can reciprocate longitudinally on the outside of the upper shaft 12. The four control regions S1, S2, S3 and S4 on the surface of the pushing member 3 are located above the hollow part 13. The stylus body 1, the control apparatus 2 and the pushing member 3 can be assembled to form the active stylus having switching function of the present disclosure.

As shown in FIG. 5 and FIG. 6, the switches SW1 and SW2 correspond to conductive elastomers 211, respectively. The switch SW1 or switch SW2 is at ON status (i.e. closed loop) when the respective conductive elastomer 211 is abutted with the inner surface of the upper shaft 12 made of conductive material. The switch SW1 or the switch SW2 is at OFF status (i.e. open loop) when the respective conductive elastomer 211 does not contact the inner surface of the upper shaft 12 made of conductive material.

The stylus body 1 which has the hollow part 13 disposed at the upper shaft 12 thereof and the pushing member 3 disposed on the surface of the upper shaft 12 is just an example for preferred embodiment, but claims of the present disclosure are not limited thereto. In practical application, the hollow part 13 and the pushing member 3 can be disposed on the lower shaft 11 or the stylus body 1 correspondingly to the positions of two conductive elastomers 211, and not limited to this preferred embodiment.

The active stylus having switching function of the present disclosure can be applied to a capacitive stylus. The stylus body 1 is positioned on a surface of the touch control screen of the predetermined touch sensing device in practical usage, and utilizes the longitudinal displacement of the pushing member 3 on the upper shaft 12 of the stylus body 1 to enable the control buttons 31 within the control regions S1~S4 to press or not press the conductive elastomers 211 respectively, so as to enable the conductive elastomers 211 to contact or not contact with the inner surface of the upper shaft 12 to change the ON status or OFF status of switches SW1 and SW2, whereby the four different signals (0, 1), (1, 0), (1, 1) or (0, 0) can be generated and inputted to the control unit 212, and then the control unit 212 is driven to send different signal to a predetermined touch sensing device. Therefore, the touch nib 111 of the lower shaft 11 can execute the touch control operation of different function on the touch control screen, such as writing color changing, erasing, window switching or screen shot.

The circuit board 21 of the control apparatus 2 having two conductive elastomers 211 disposed on the surface thereof and exposed out of the hollow part 13 is just an example for preferred embodiment, but claims of the present disclosure are not limited thereto. In practical application, the circuit board 21 of the control apparatus 2 of the present disclosure may comprise one or a plurality of conductive elastomers 211 disposed on the surface thereof and apart from each other, and the pushing member 3 can have control regions S1-S4 in different number and positions on the surface thereof to correspond to the number and positions of the conductive elastomers 211, whereby the contact status between each of the conductive elastomers 211 and upper shaft 12 can be changed to send different signal to the control unit 212 when the pushing member 3 is moved longitudinally, so the present disclosure is not limited to the preferred embodiment.

According to the longitudinal displacement of the pushing member 3 on the outside of the upper shaft 12 of the stylus body 1, the active stylus having switching function of the present disclosure can change the contact status between each of control regions S1~S4 of the pushing member 3 and the stylus body 1, to generate different input signal to the circuit board 21 to drive the circuit board 21 to switch the operating function of the stylus on the touch control screen without disposing multiple function shortcut buttons on the surface of the stylus body 1. Therefore, the active stylus of the present disclosure can prevent the user from mistakenly touching and starting the unexpected function operation while griping the stylus, the operating convenience of the stylus can be improved.

The above-mentioned content is just the preferred embodiment of the present disclosure, but the claims of the present disclosure are not limited thereto. The present disclosure mainly directs to the active stylus having switching function which can utilize the longitudinal displacement of the pushing member 3 on the outside of the stylus body 1 to change the contact status between each conductive elastomer 211 in respective one of the control regions S1~S4 and the stylus body 1, to further generate different input signal to the circuit board 21 for driving the circuit board 21 to send different signal to the predetermined touch sensing device, to switch the function operation of the stylus on the touch control screen.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An active stylus having switching function comprising a stylus body, a control apparatus and a pushing member, wherein:
    an accommodating space is formed inside the stylus body, and the stylus body has a hollow part disposed at a surface thereof, and the hollow part is communicated with the accommodating space;
    the control apparatus is disposed in the accommodating space and has a circuit board which sends a signal to a predetermined touch sensing device to execute a touch control operation, and the circuit board is connected electrically to one conductive elastomer or a plurality of conductive elastomers apart from each other which are exposed out of the hollow part;
    the pushing member is disposed on the surface of the stylus body and located above the hollow part, and the pushing member has one or more control regions defined on the surface thereof, and a contact status between each conductive elastomer and the stylus body in the one or more control regions is changed according to a longitudinal movement of the pushing member, to provide one of a series of signals for driving the circuit board to output a corresponding control signal to the predetermined touch sensing device.

2. The active stylus having switching function as claimed in claim 1, wherein the stylus body has a lower shaft which has a touch nib disposed at a front end thereof and an upper shaft disposed at other end of the stylus body opposite to the touch nib, and the control apparatus has a circuit board disposed inside the lower shaft and the upper shaft, each of the conductive elastomers is electrically connected to a surface of the circuit board, and the pushing member is disposed on a surface of the upper shaft.

3. The active stylus having switching function as claimed in claim 1, wherein the circuit board of the control apparatus is provided with a power source respectively connected electrically with ends of resistors the same as the conductive elastomers in number, and other ends of the resistors are respectively connected electrically to ends of switches which is turned on by the conductive elastomer contacting with the stylus body, and ends of the switches are respectively connected electrically to the control unit which sends signal to the predetermined touch sensing device, and other ends of the switches are grounded.

4. The active stylus having switching function as claimed in claim 3, wherein the hollow part of the stylus body has through holes corresponding to the conductive elastomers in number, and the switches are exposed out of the through holes respectively.

5. The active stylus having switching function as claimed in claim 1, wherein at least one control button is disposed on one or more control regions of the pushing member, and each control button is an elastomer, and each elastomer has a protrudent block disposed on the top end thereof and toward inside the hollow part to abut against each conductive elastomer.

6. The active stylus having switching function as claimed in claim 1, wherein the hollow part of the stylus body has two through holes apart from each other transversely, and the circuit board of the control apparatus has two conductive elastomers disposed on the surface thereof and exposed out of the through holes, the pushing member has four control regions defined on the surface thereof in order from top to bottom, and the four control regions are respectively provided with a right-side control button, a left-side control button, two transversely aligned control buttons and no control button.

* * * * *